US011837007B2

(12) United States Patent
Du et al.

(10) Patent No.: US 11,837,007 B2
(45) Date of Patent: Dec. 5, 2023

(54) PEDESTRIAN RE-IDENTIFICATION METHOD BASED ON VIRTUAL SAMPLES

(71) Applicant: WUHAN UNIVERSITY, Hubei (CN)

(72) Inventors: Bo Du, Hubei (CN); Xiaoyang Guo, Hubei (CN); Yutian Lin, Hubei (CN); Chao Zhang, Hubei (CN); Zheng Wang, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/337,439

(22) Filed: Jun. 20, 2023

(65) Prior Publication Data

US 2023/0334895 A1 Oct. 19, 2023

Related U.S. Application Data

(63) Continuation-in-part of application No. PCT/CN2021/122343, filed on Sep. 30, 2021.

(30) Foreign Application Priority Data

Jan. 28, 2021 (CN) .......................... 202110122521.4

(51) Int. Cl.
*G06V 40/10* (2022.01)
*G06V 10/82* (2022.01)
(Continued)

(52) U.S. Cl.
CPC ............ *G06V 40/103* (2022.01); *G06T 7/194* (2017.01); *G06V 10/80* (2022.01); *G06V 10/82* (2022.01); *G06T 2207/20221* (2013.01)

(58) Field of Classification Search
CPC ...... G06V 40/103; G06V 10/82; G06V 10/80; G06T 7/194; G06T 2207/20221
(Continued)

(56) References Cited

U.S. PATENT DOCUMENTS

| 2019/0378333 | A1 | 12/2019 | Castaneda et al. |
| 2020/0226421 | A1 | 7/2020 | Almazan et al. |
| 2023/0004760 | A1* | 1/2023 | Mustikovela .... G06V 30/18057 |

FOREIGN PATENT DOCUMENTS

| CN | 110414462 | 11/2019 |
| CN | 110427813 | 11/2019 |

(Continued)

OTHER PUBLICATIONS

"International Search Report (Form PCT/ISA/210) of PCT/CN2021/122343," dated Dec. 30, 2021, with English translation thereof, pp. 1-7.

(Continued)

*Primary Examiner* — Kenny A Cese
(74) *Attorney, Agent, or Firm* — JCIP GLOBAL INC.

(57) ABSTRACT

This invention proposes a pedestrian re-identification method based on virtual samples, comprising following steps: s1) obtaining virtual persons generated by game engine, and generating the virtual samples with person labels by fusing a background of a target dataset and a pose of real persons through a multi-factor variational generation network; s2) rendering the generated virtual samples according to lighting conditions; s3) sampling the rendered virtual samples according to person attributes of target dataset; s4) constructing a training dataset according to virtual samples obtained by sampling to train a pedestrian re-identification model, and verifying identification effect of the trained model. The present invention uses a virtual image generation framework that integrates translation-rendering-sampling to narrow the distribution between virtual images and real images as much as possible to generate virtual samples, and conduct person re-identification model training, which can be effectively and effectively applied to pedestrian datasets in real scenes.

7 Claims, 3 Drawing Sheets

(51) Int. Cl.
*G06T 7/194* (2017.01)
*G06V 10/80* (2022.01)

(58) Field of Classification Search
USPC .......................................................... 382/103
See application file for complete search history.

(56) References Cited

FOREIGN PATENT DOCUMENTS

| | | |
|---|---|---|
| CN | 110490960 | 11/2019 |
| CN | 110555390 | 12/2019 |
| CN | 110796080 | 2/2020 |
| CN | 112784783 | 5/2021 |
| WO | 2020249961 | 12/2020 |

OTHER PUBLICATIONS

"Written Opinion of the International Searching Authority (Form PCT/ISA/237) of PCT/CN2021/122343," dated Dec. 30, 2021 with English translation thereof, pp. 1-9.

* cited by examiner

PEDESTRIAN RE-IDENTIFICATION METHOD BASED ON VIRTUAL SAMPLES

CROSS-REFERENCE TO RELATED APPLICATION

This is a continuation-in-part application of International Application No. PCT/CN2021/122343, filed on Sep. 30, 2021, which claims the priority benefits of China Application No. 202110122521.4, filed on Jan. 28, 2021. The entirety of each of the above-mentioned patent applications is hereby incorporated by reference herein and made a part of this specification.

BACKGROUND

Technical Field

The disclosure belongs to a technical field of image processing and relates to an image retrieval method, specifically to a pedestrian re-identification method based on virtual samples.

Description of Related Art

Pedestrian re-identification (re-ID) aims to match a person from multiple non-overlapped cameras deployed at different locations. In recent years, re-ID has been extensively studied, due to its wide range of applications such as finding people of interest (e.g. lost kids or criminals) and person tracking. Benefiting from deep convolutional neural networks, the proposed re-ID methods have achieved impressive performances. However, these re-ID methods rely on a large number of pedestrian images (i.e. person images) from surveillance videos for training, which will expose personal private information and further incur security issues. For example, the re-ID dataset DukeMTMC-reID has been withdrawn because of privacy issues, and the images of the re-ID dataset MSMT17 are asked not to be shown in any form of publication. Prof. Kate Saenko, Boston University, raised a concern on Twitter that the AI research community should not allow the research publication that use re-ID datasets collected without the consent of the people recorded.

Recently, some unsupervised domain adaptation (UDA) approaches are proposed, which usually learn an identity discriminative feature embedding model on the source dataset, and transfer the learned model to the unseen target domain. The state-of-the-art UDA methods usually fall into two categories, clustering-based methods and generation-based methods. It must be noted that the former method relies on the target images for unsupervised clustering, while the latter method also archives the target images for image translation or adversarial training. As all UDA re-ID methods face the problem of privacy leakage, it is urgent to propose effective solutions to deal with pedestrian re-identification with privacy protection.

SUMMARY

The purpose of the present invention is to provide a pedestrian re-identification method based on virtual samples for the deficiencies of the prior art, which solves the problem of pedestrian re-identification under privacy protection in the prior art, and solves the challenge of missing pedestrian appearance in target images and the challenge of a large domain gap between virtual and real images.

In order to solve the problems of the technologies described above, the present invention adopts the following technical solutions:

A privacy protected person re-identification method based on virtual samples comprising:

Step s1: Obtaining the virtual person generated by the game engine for preprocessing, and generating virtual samples with person labels by fusing the background of the target dataset and the pose of real person through the multi-factor variational generation network;

Step s2: Rendering the generated virtual samples according to the lighting conditions of the target dataset;

Step s3: Sampling the rendered virtual samples according to the person attributes of the target dataset;

Step s4: Constructing a training dataset according to the virtual samples obtained by sampling to train a pedestrian re-identification model, and verifying an identification effect of the trained model.

Further, the step s1 includes:

Step s11: Extracting k persons from the virtual dataset generated by the game engine, and extracting l backgrounds from the real pedestrian dataset, denoted as $\{c_1, \ldots, c_k\}$ and $\{b_1, \ldots, b_l\}$ respectively, fusing these two directly to obtain n virtual images associated with fusing the virtual persons and a real background as training samples $\{x_1, \ldots, x_n\}$;

Step s12: Extracting the person pose of each of the training samples respectively. Using it (i.e. the pose), the training samples and the corresponding background as the input of a constructed deep neural network based on a variational autoencoder, that is, the multi-factor variational generation network. Constructing the objective function to train for the network to learn and to obtain a transformation law of a fused image about the persons, backgrounds and poses;

Step s13: Adjusting the resolution of the virtual person according to the person resolution of the target dataset;

Step s14: using the adjusted virtual person, the real background and the pose extracted from the target dataset as the input of the network, and the virtual samples with person labels are generated through the network.

Further, in step S12, the objective function is:

$$\min_{\theta,\Phi} \sum_i \lambda_i \|\Phi_i(x) - \Phi_i(D_\theta(z_{(x,y)}))\|_1 - KL(q_\phi(z_{(x,y)}|x) \| p_\theta(z_{(x,y)}))$$

wherein x is the inputted training samples, $z_{(x,y)}$ is a joint latent variable, $D_\theta$ is the decoder network as the generator, $\Phi_i$ is feature parameters extracted at different network levels, $q_\phi$ is a parameter of the posterior distribution, $p_\theta$ is a prior distribution parameter, KL is a Kullback-Leibler divergence, i and $\lambda_i$ are pre-defined hyper-parameters, which are used to control the contribution of different network layers to the total loss.

Further, in step s13, calculating the proportion of pixels in the images of the persons in the virtual dataset and the real pedestrian dataset respectively, and adjusting the resolution of the virtual persons by scaling the persons in the virtual dataset to make it have a resolution similar to that of the target dataset.

Further, in step s2, converting each image to a HSV format, extracting a V channel and calculating the average value of the V channel as the brightness value of the image. The brightness value of the channel ranges from 0 to 255, so as to obtain the lighting conditions of the target dataset.

Further, in step s3, two attributes of the color of the upper body clothes and the color of the lower body clothes are selected as the basic attributes of sampling to carry out the attribute distribution statistics of the dataset.

Further, in step s4, an identification verification process includes: using the trained model to match the retrieved pictures in the gallery that are judged to be pictures of the same identity and outputting the corresponding picture indexes in order according to the possibility, and comparing them with the real labels.

The beneficial effects of the present disclosure are:

Pedestrians in real scenes with multiple backgrounds and multiple pose transformations under different cameras lead to poor robustness of existing pedestrian re-identification models, inconsistent resolution due to the distance relationship between pedestrians and cameras, and different lighting conditions. Aiming at the problem of image brightness difference caused by the environment and the inconsistency of attribute distribution caused by the difference in clothing that may be caused by seasonal changes, the present invention uses a virtual image generation framework that integrates translation-rendering-sampling to bring the virtual image and the real image as close as possible. The distribution among them and generate a batch of new virtual samples, and further use these virtual samples to train the pedestrian re-identification model, which can be effectively applied to the pedestrian dataset in the real scene, so as to achieve the goal without obtaining the target domain. An effective pedestrian re-identification model is learned under the condition of real pedestrian dataset person appearance, and the pedestrian re-identification task under privacy protection is completed. Specifically include the following aspects:

(1) The present disclosure designs a privacy-protected person re-ID method. For the target dataset, only privacy-irrelevant information is provided, without any person appearance. The disclosure uses the virtual persons generated by the game engine to replace the real pedestrians for the training the person re-identification model.

(2) The disclosure defines three kinds of privacy-irrelevant information, including content information (i.e., background and pose), imaging information (i.e., resolution and lighting) and description information (i.e., person attributes).

(3) The disclosure designs a virtual image generation framework integrating image translation-rendering-sampling to process the virtual data generated in the game engine to obtain virtual samples, effectively closes the domain gap between the virtual samples and the real images.

(4) The disclosure designs a multi-factor variational generation (MVG) network that encodes multiple privacy-irrelevant factors to translate virtual samples to images with fused realistic content.

Therefore, the technical solution of the present disclosure is able to generate virtual samples that are similar to real person images, and with these virtual samples to conduct pedestrian re-identification without accessing real person appearance.

DESCRIPTION OF THE EMBODIMENTS

Figure 1:
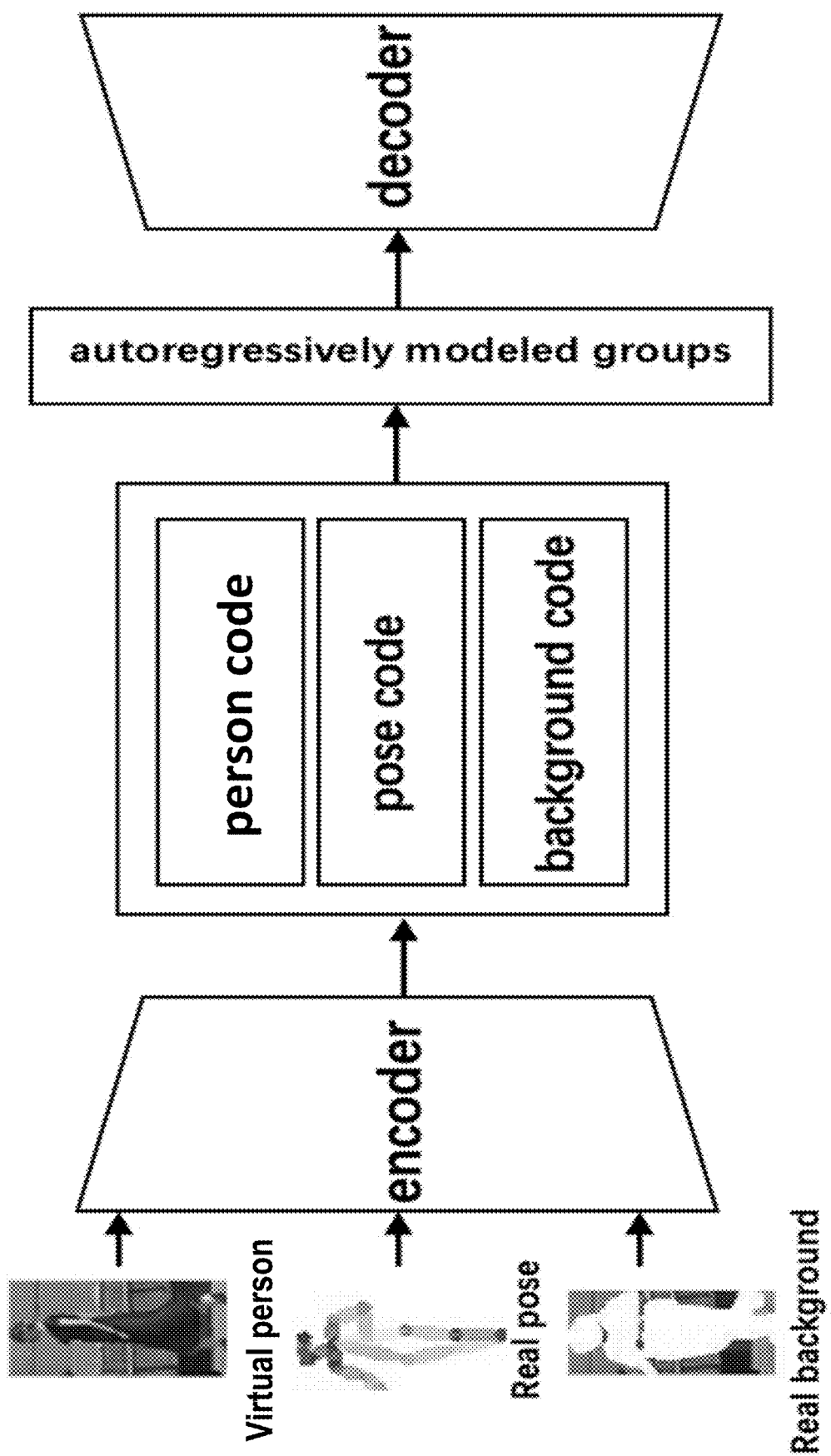
FIG. 1 is a schematic diagram of a deep neural network structure of a multi-factor variation generational network in an embodiment of the present disclosure.

The present disclosure will be further described below in conjunction with the embodiments shown in the accompanying figures.

This embodiment discloses a pedestrian re-identification method based on virtual samples, and aims to provide a pedestrian re-identification scheme under privacy protection. Since the appearance of real pedestrians cannot be obtained because of privacy issue, the scheme of the present disclosure uses the virtual image generated by the game engine as the source dataset for extracting person features. However, the re-identification model trained with only virtual images does not perform well on the real pedestrian target dataset because of the huge domain gap between the virtual source dataset and the real pedestrian dataset. In order to better adapt the model learned from virtual samples to the real target domain, the scheme of the present disclosure introduces three types of privacy-independent information, including content information (background and pose, etc.), imaging information (foreground resolution and lighting conditions, etc.) and description information (clothes color and other human attributes, etc). The content information contains the information of the real world and the physical state of real pedestrians, the imaging information forces the image style to approach the target domain, and the description information makes the overall attribute distribution of the dataset have statistical semantic consistency.

The pedestrian re-identification method based on virtual samples comprising following steps:

Step S1: obtaining the virtual persons (also referred as virtual person images) generated by the game engine for preprocessing, and generating virtual samples with person labels by fusing a background of a target dataset and a pose of real persons (also referred as real person images) through a multi-factor variational generation network. Specifically, step 1 comprising following steps:

Step S11: extracting k persons from the virtual dataset generated by the game engine, and extracting l backgrounds from the real pedestrian dataset, denoted as $\{c_1, \ldots, c_k\}$ and $\{b_1, \ldots, b_l\}$ respectively. Fusing these two (i.e. the k persons and the l backgrounds) directly to obtain n virtual images associated with fusing the virtual persons and a real background as training samples $\{x_1, \ldots, x_n\}$;

Step S12: extracting the person pose of each of the training samples respectively. Using it (i.e. the pose), the training samples and the corresponding background as the input of a constructed deep neural network based on a variational autoencoder, that is, the multi-factor variational generation network. Constructing the objective function to train for the network to lean and to obtain a transformation law of a fused image about the persons (i.e. different persons), backgrounds and poses.

where the objective function in Step S12 is defined as:

$$\min_{\theta,\Phi} \sum_i \lambda_i \|\Phi_i(x) - \Phi_i(D_\theta(z_{(x,y)}))\|_1 - KL(q_\phi(z_{(x,y)}|x) \| p_\theta(z_{(x,y)}))$$

wherein x is the inputted training sample, $z_{(x,y)}$ is a joint latent variable, $D_\theta$ is the decoder network as the generator, $\Phi_i$ is feature parameters extracted at different network levels, $q_\phi$ is parameter of the posterior distribution, $p_\theta$ is the prior distribution parameter, KL is Kullback-Leibler divergence, i and $\lambda_i$ are pre-defined hyper-parameters, which are used to control the contribution of different network layers to the total loss.

Step s13: adjusting the resolution of the virtual person according to the person resolution of the target dataset.

In Step s13, calculating the proportion of pixels in the images of the persons in the virtual dataset and the real pedestrian dataset respectively, and adjusting the resolution of the virtual persons by scaling the persons in the virtual dataset to make it have a resolution similar to that of the target dataset;

Step s14: using the adjusted virtual person, the real background and the pose extracted from the target dataset as the input of the network, and the virtual samples with person labels are generated through the network.

Step s2: rendering the generated virtual samples according to the lighting conditions of the target dataset.

In step s2, converting each image to HSV format, extracting the V channel and calculating the average value of the V channel as the brightness value of the image. The brightness value of this channel ranges from 0 to 255, so as to obtain the lighting conditions of the target dataset;

Step s3: sampling the rendered virtual samples according to the person attributes of the target dataset.

In step s3, the two attributes of the color of the upper body clothes and the color of the lower body clothes are selected as the basic attributes of sampling to carry out the attribute distribution statistics of the dataset.

Step s4: constructing a training dataset according to the virtual samples obtained by sampling to train a pedestrian re-identification model, and verifying an identification effect (also referred as re-identification effect) of the trained model. In step s4, an identification verification process includes: using the trained model to match the retrieved pictures in the gallery that are judged to be pictures of the same identity (i.e. ID), and outputting the corresponding picture indexes in order according to the possibility, and comparing them with the real labels.

According to the pedestrian re-identification method of this embodiment, under the privacy-protected pedestrian re-identification setting, the appearance of pedestrians in the real pedestrian dataset in the target domain can not be obtained. The method of the present disclosure turns to virtual persons generated by game engines to extract identity discriminative features. Based on this strategy, new virtual samples are generated by fusing virtual persons and real backgrounds to construct a privacy protected training set to learn the pedestrian re-identification model. Further, to close the gap between the virtual samples and real pedestrian images, three strategies are applied: 1) the content information (background, pose, etc.) of the real pedestrian dataset in the target domain is used to perform basic transformations to the virtual samples. 2) the imaging information (foreground resolution and lighting conditions, etc.) from the real pedestrian dataset in the target is applied to virtual samples. 3) the image sampling is applied to virtual samples based on description information (clothes color and other human attributes) from the real pedestrian dataset. During training, the model only access to the generated virtual samples, while during evaluation, the whole procedure is completed under black-box conditions, thereby achieving the goal of pedestrian re-identification under privacy protection.

The embodiment of the present disclosure provides a pedestrian re-identification method based on virtual samples including the following steps:

Step S1: Since the virtual samples lack real-world information, privacy-irrelevant information (also referred as privacy-independent information) is introduced from the real-world dataset to generate more realistic images. We define the virtual dataset as $X_s$ and the real pedestrian dataset as $X_t$. Pedestrian images usually contain two parts, the background and the foreground pedestrian. In the traditional pedestrian re-identification task, many methods propose to reduce the influence of the background through the attention mechanism, segmentation or local feature extraction, so that the model can pay more attention to the pedestrian itself. However, under privacy protected pedestrian re-identification task, learning from pedestrian images in the virtual dataset will make the model unable to locate the pedestrian in the real scene. Moreover, using purely virtual data for training will weaken the generalization ability of the pedestrian re-identification model. To alleviate this problem, the scheme of the present disclosure proposes to perform image fusion of the virtual persons of the virtual dataset and the real background of the target domain dataset.

In practice, a self-correcting human body parsing network is used to extract the person mask in each image, and the area covered by the mask is further erased from the pedestrian image, thereby avoiding the leakage of appearance information related to pedestrian privacy. In order to obtain a complete image background, the background image with pedestrians removed is inpainted using a recurrent feature inference network to obtain a complete background image. During the inpainting process, the edges of the person mask obtained by the self-correcting human body parsing network are incomplete, so dilation and erosion techniques are used to fill in the missing pixels to further improve the integrity of the person mask. Here, it is worth mentioning that the erasure process of real pedestrian images should be completed by the image provider to avoid privacy leakage. Different from the complex real scene of the real dataset, this embodiment uses a cutout script to extract the virtual person from the virtual image with a solid color background, to extract the virtual person from its background more quickly and conveniently.

Extracting k persons from the virtual dataset generated by the game engine denoted as $\{c_1, \ldots, c_k\}$. And extracting l backgrounds from the real pedestrian dataset, denoted as $\{b_1, \ldots, b_l\}$. The persons and backgrounds are directly fused to obtain n virtual images as training samples $\{x_1, \ldots, x_n\}$;

Extracting the person pose of each of the training samples respectively. Using it (i.e. the pose), the training samples and the corresponding background as the input of a constructed deep neural network based on a variational autoencoder, that is, the multi-factor variational generation network, constructing an objective function to train for the network to learn and to obtain a transformation law of a fused image about the persons, the backgrounds and the poses. As shown in FIG. 1, the multi-factor variational generation network uses a variety of factors that are irrelevant with privacy (such as background, posture, etc.). The modeling of joint latent variables is followed by a decoder network to generate virtual samples with the content of the target image. The specific modeling process is as follows:

Assuming the training sample images are fused by foreground person c and background b. To control c and b, constructing the maximum probability distribution p (x|c,b) as a generator, a variational autoencoder is used to model p(x|z), where z represents a latent variable, and p(z) represents the prior for the standard normal distribution in the variational autoencoder framework. However, without guaranteeing the prior condition, the latent variables c and b are separated in the latent space. Therefore, to model z with information of c and b, denote z as a joint latent variable $z_{(c,b)}$. Since the foreground content information of person c is included in the fused image x, x is used to encode c. Finally, the goal is to learn $p(x|z_{(x,b)})$, which need to maximize the log-likelihood of the given training data, and use the neural network to infer the hidden variable z encoded from x and b. So there are:

$$\log p(x) = \log \int p(x, z_{(x,y)}) dz_{(x,y)} \geq E_{q(z_{(x,y)})} \log \frac{p(x, z_{(x,y)})}{q(z_{(x,y)}|x)} =$$

$$E_{q(z_{(x,y)})} \log \frac{p(x|z_{(x,y)})p(z_{(x,y)})}{q(z_{(x,y)}|x)}$$

Where $q(z_{(x,b)}|x)$ is the approximate posterior distribution over the encoder. To avoid difficult integrals, the variational lower bound $\mathcal{L}_{VAE}(x)$ can be written in terms of log p (x) as:

$$\mathcal{L}_{VAE}(x) = E_{q(z_{(x,y)}|x)} \log \frac{p(x|z_{(x,y)})p(z_{(x,b)})}{q(Z_{(x,y)}|x)} =$$

$$E_{q(Z_{(x,y)}|x)}[\log p(x|z_{(x,y)})] - E_{q(Z_{(x,y)}|x)}[\log q(z_{(x,y)}|x) - \log p(z_{(x,y)})] =$$

$$E_{q(Z_{(x,y)}|x)}[\log p(x|z_{(x,y)})] - KL(q(z_{(x,y)}|x) \| p(z_{(x,b)}))$$

where KL is Kullback-Leibler divergence.

As discussed above, traditional encoder-decoder structures for variational autoencoders are not suitable for learning representations with multiple latent variables. To this end, the scheme of the present disclosure proposes a novel multi-factor variational generation network. As shown in FIG. 1, the multi-factor variational generation network feeds the person, background and pose into the encoder network respectively to obtain its low-dimensional feature encoding. A multi-factor variational generation network concatenates target domain-related codes into a joint code before being fused with person codes. At the same time, to improve the expressive ability of the variational autoencoder, the multi-factor variational generation network adopts autoregressively modeled groups to construct the joint latent variable representation $z_{(x,b)}$. According to the variational lower bound $\mathcal{L}_{VAE}(x)$ and the given prior $p(z_{(x,b)})$, the parameters required for the generation model can be learned by training the above multi-factor variational generation network. In this embodiment, it is assumed that the parameters of the prior distribution and the posterior distribution are θ and φ, respectively. In this embodiment, $p(z_{(x,b)})$ is Gaussian distribution, and the parameters θ and φ are inferred by the neural network. The training loss function is as follows:

$$\min_{\theta,\phi} E_{q_\phi(z_{(x,b)}|x)}[\log p_\theta(x|z_{(x,y)})] - KL(q_\phi(z_{(x,y)}|x) \| p_\theta(z_{(x,y)}))$$

Based on the above loss function, this embodiment combines the perceptual function Φ to extract more visually intuitive features, which are used to calculate the perceptual loss between the original image input and the image generated by the decoder network. Therefore, the final loss function is defined as:

$$\min_{\theta,\Phi} \sum_i \lambda_i \|\Phi_i(x) - \Phi_i(D_\theta(z_{(x,y)}))\|_1 - KL(q_\phi(z_{(x,y)}|x) \| p_\theta(z_{(x,y)}))$$

where $\Phi_i$ denotes the features extracted from each layer of the visual perception network, i and $\lambda_i$ are hyperparameters used to control the contribution of different layers of the visual perception network in the total loss. $D_\theta$ represents the decoder network as a generator;

Further, extract the poses of pedestrians in the target dataset under black-box conditions to ensure privacy protection and adjust the resolution of virtual samples. Person resolution refers to the number of pixels of foreground pedestrians in the image. In real scenes, images of different pedestrians are usually different according to the position and viewpoint of the camera. In the virtual dataset obtained by the game engine, the number of pixels occupied by each person in the virtual image is basically the same. Therefore, the distribution of person resolutions has a large gap between the virtual source domain and the target real domain. In this embodiment, the person in the source domain is scaled so that the pixel ratio of the person in the entire image can be closer to the target domain. The mask of the person in each image is first obtained by a self-correcting human body parsing network, and then the number of pixels occupied by the person mask is divided by the number of pixels of the entire image to obtain the percentage. Calculate the proportion of pixels in the image of the persons in the virtual dataset and the target dataset respectively, and scale the persons in the virtual dataset accordingly to adjust the resolution of the virtual persons to have a similar percentage to the target domain.

Figure 2:
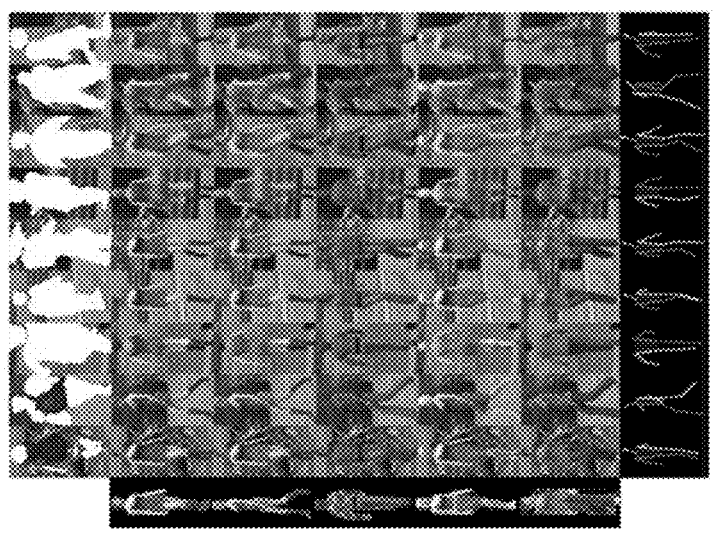
FIG. 2 shows sample images generated by the multi-factor variational generation (MVG) network.
Figure 2:
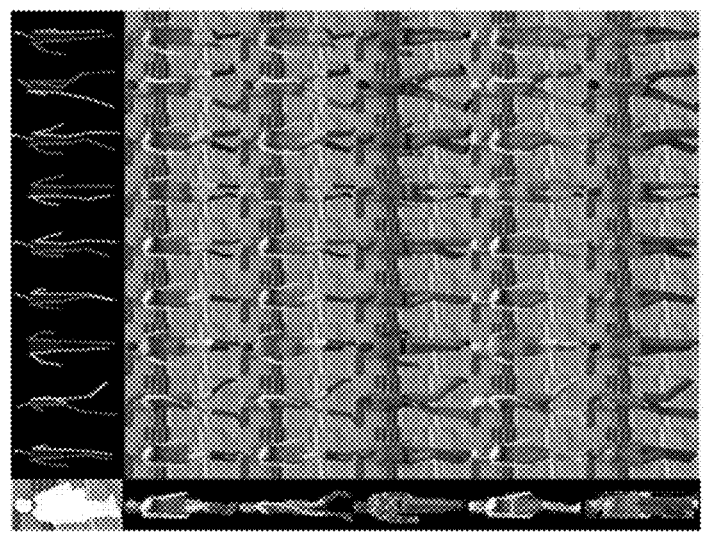
Figure 2:
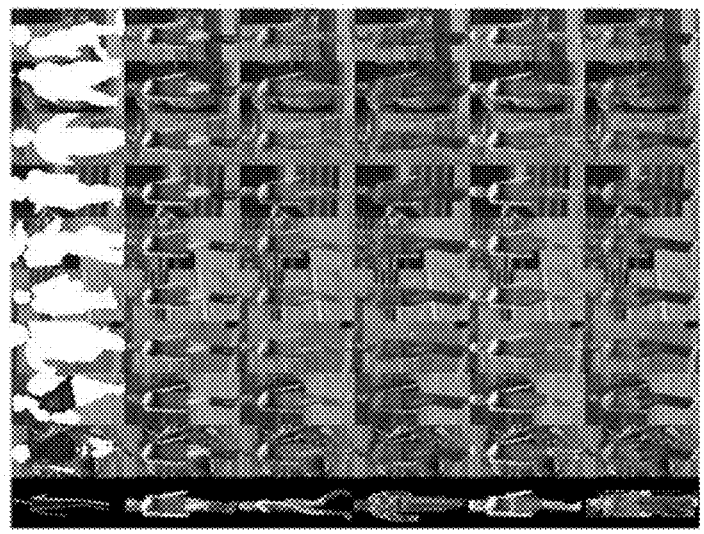

Finally, the adjusted virtual person, the real background and the pedestrian pose extracted from the target dataset are used as the input of the deep neural network to generate a batch of virtual samples with person labels. Referring to FIG. 2. FIG. 2 shows sample images generated by the multi-factor variational generation (MVG) network. (a), (b), and (c) of FIG. 2 show virtual images with different generation strategies.

Figure 3:
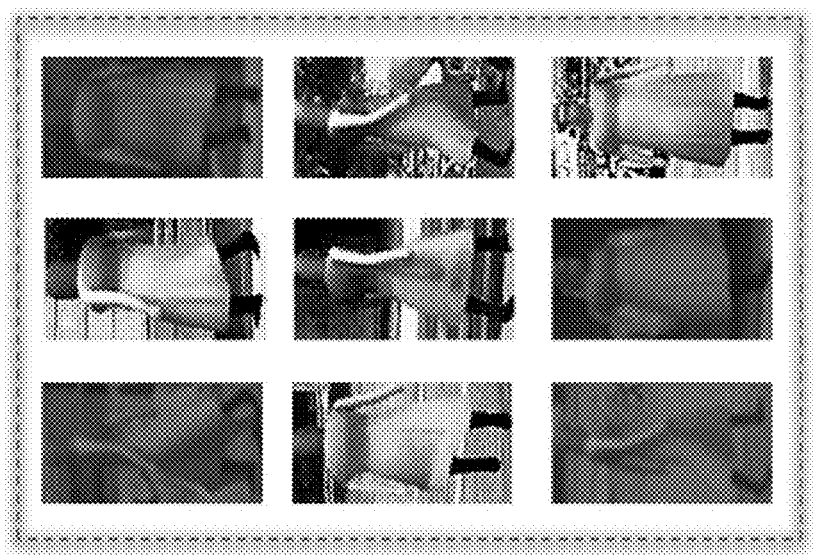
FIG. 3 shows generated virtual images, images with the adjustment of foreground resolution, and images with the adjustment of lighting.
Figure 3:
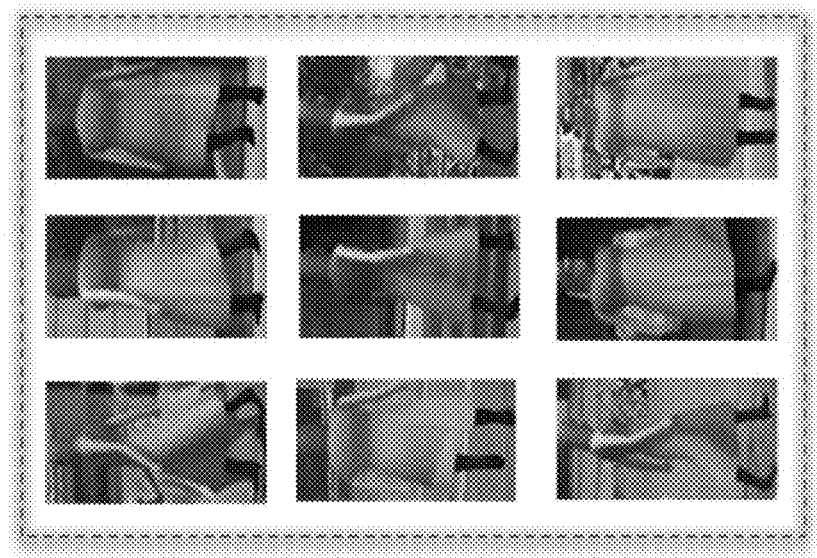
Figure 3:
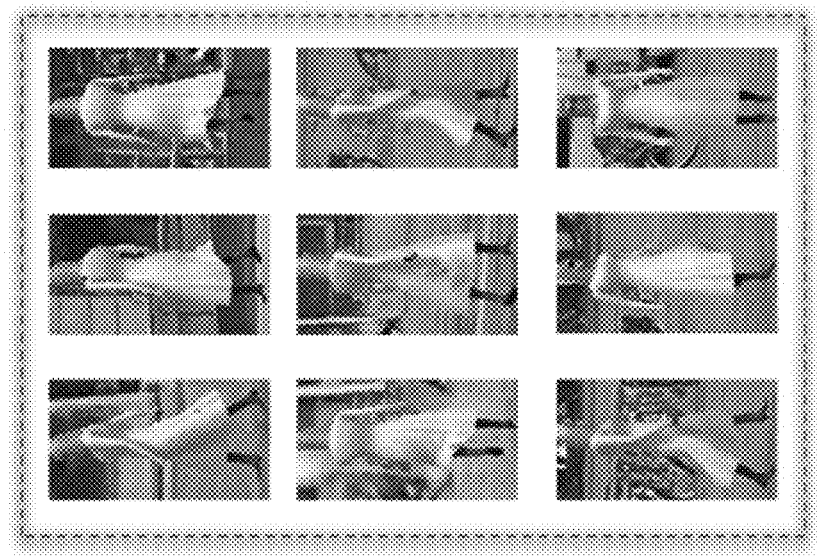

Step S2: rendering the generated virtual samples according to lighting conditions of the target dataset. Referring to FIG. 3. Specifically, (a) of FIG. 3 illustrated generated virtual images. (b) of FIG. 3 illustrated images with the adjustment of foreground resolution. (c) of FIG. 3 illustrated images with the adjustment of lighting. As shown in FIG. 3, considering images taken at different times, backgrounds, viewpoints, etc., lighting conditions can vary greatly across datasets. Some datasets only have specific lighting conditions, such as datasets captured at night. Due to the huge brightness difference, the learned pedestrian re-identification model may not be well applied to the real target domain. To solve this problem, the scheme of the present application adjusts the lighting conditions of the source domain to adapt to the lighting conditions of the target domain. In order to obtain the lighting conditions of the target dataset, each image is converted to HSV format, the V channel is extracted and the average value of the V channel is calculated as the brightness value of the image, which ranges from 0-255. By calculating the brightness values of the images from the virtual source domain and the real target domain, this embodiment multiplies each image by the same coefficient to adjust the lighting conditions of the source domain, so that the lighting distributions of the two domains have similar peak distributions.

Step S3: sampling the rendered virtual samples according to the person attributes of the target dataset. The virtual samples from the target domain are sampled based on descriptive information such as clothing style, age, gender, etc. For virtual datasets, the attributes of persons can be manually set to ensure diversity. With the help of a powerful game engine, the description information of virtual persons usually has a variety of characteristics. In real scenes, the images of the dataset are usually captured in a specific area within a limited period of time. For example, some real pedestrian datasets are captured on campus in summer, and there are a large number of pedestrians wearing T-shirts and backpacks. In this embodiment, the virtual image is sampled according to the description information of the real target domain, so that the attribute characteristics of the virtual person are as consistent as possible with the real scene, so that the learned pedestrian re-identification model can better adapt to the target domain. In order to simplify the attribute distribution statistical process of the dataset, two attributes are selected as the basic attributes of sampling, including the color of the upper body clothes and the color of the lower body clothes.

Step S4: Verify the identification effect (also referred as re-identification effect). Construct a training dataset according to the virtual samples obtained by sampling to train a pedestrian re-identification model, and verifying an identification effect of the trained model, and use the trained model to match the retrieved pictures in the gallery that are judged to be the same identity (i.e. same ID pictures), and output the corresponding picture indexes in order according to the possibility, and compare with the real labels.

The pedestrian re-identification method based on virtual samples of the present invention could be executed by an electronic equipment in practical implementations, wherein the electronic equipment comprises:

(1) Processor: The processor may be a central processing unit (CPU) or other forms of processing units (such as a graphics processing unit, GPU) capable of data processing and instruction execution, and may control other components in the above-mentioned electronic equipment to perform desired functions.

(2) Memory: The memory may include one or more computer program products, which may include various forms of computer-readable storage media, such as volatile memory and/or non-volatile memory. The volatile memory may include, for example, random access memory (RAM) and/or cache memory (cache). The non-volatile memory may include a read-only memory (ROM), a hard disk, and a flash memory. Images of virtual persons and real persons to be processed and computer program instructions related to the pedestrian re-identification method based on virtual samples of the present invention can be stored in the memory. When the computer program instructions are executed by the processor, the processor performs the pedestrian re-identification operations described in any one of steps s1-s4 of the present invention, to realize the pedestrian re-identification method based on virtual samples described in this invention.

It should be understood that the parts not elaborated in this specification are prior technology.

It should be understood that the above descriptions of the better embodiment is more detailed, and cannot be regarded as a limitation of the scope of invention patent protection, ordinary skilled in the art under the inspiration of the invention, without departing from the scope of the claims of the invention, may also make alterations or variations, all fall within the scope of invention protection, the scope of protection of the invention shall be subject to the attached claims.

What is claimed is:

1. A pedestrian re-identification method based on virtual samples, comprising following steps:
   step s1: obtaining virtual persons generated by a game engine for preprocessing, and generating the virtual samples with person labels by fusing a background of a target dataset and a pose of real persons through a multi-factor variational generation network;
   step s2: rendering the generated virtual samples according to lighting conditions of the target dataset;
   step s3: sampling the rendered virtual samples according to person attributes of the target dataset;
   step s4: constructing a training dataset according to the virtual samples obtained by sampling to train a pedestrian re-identification model, and verifying an identification effect of the trained model.

2. The pedestrian re-identification method based on virtual samples according to claim 1, wherein:
   step s1 includes:
   step s11: extracting k persons from a virtual dataset generated by the game engine, and extracting l backgrounds from a real pedestrian dataset, denoted as $\{c_1, \ldots, c_k\}$ and $\{b_1, \ldots, b_l\}$ respectively, fusing these two directly to obtain n virtual images associated with fusing the virtual persons and a real background as training samples $\{x_1, \ldots, x_n\}$;
   step s12: extracting a person pose of each of the training samples respectively, using it, the training samples and a corresponding background as an input of a constructed deep neural network based on a variational autoencoder, that is, the multi-factor variational generation network, constructing an objective function to train for the network to learn and to obtain a transformation law of a fused image about the persons, the backgrounds and the poses;
   step s13: adjusting a resolution of the virtual person according to a person resolution of the target dataset;
   step s14: using the adjusted virtual person, the real background and the pose extracted from the target dataset as the input of the network, and the virtual samples with the person labels are generated through the network.

3. The pedestrian re-identification method based on virtual samples according to claim 2, wherein:
   in step S12, the objective function is:

$$\min_{\theta,\Phi} \sum_i \lambda_i \|\Phi_i(x) - \Phi_i(D_\theta(z_{(x,y)}))\|_1 - KL(q_\phi(z_{(x,y)}|x) \| p_\theta(z_{(x,y)}))$$

wherein x is the inputted training samples, $z_{(x,y)}$ is a joint latent variable, $D_\theta$ is a decoder network as a generator, $\Phi_i$ is feature parameters extracted at different network levels, $q_\phi$ is a parameter of the posterior distribution, $p_\theta$ is a prior distribution parameter, KL is a Kullback-Leibler divergence, i and $\lambda_i$ are pre-defined hyper-parameters, which are used to control a contribution of different network layers to a total loss.

4. The pedestrian re-identification method based on virtual samples according to claim 2, wherein:
   in step s13, calculating a proportion of pixels in images of the persons in the virtual dataset and the real pedestrian dataset respectively, and adjusting the resolution of the virtual persons by scaling the persons in the virtual dataset to make it have the resolution similar to that of the target dataset.

5. The pedestrian re-identification method based on virtual samples according to claim 1, wherein:
in step s2, converting each image to a HSV format, extracting a V channel and calculating an average value of the V channel as a brightness value of the image, the brightness value of the channel ranges from 0 to 255, so as to obtain the lighting conditions of the target dataset.

6. The pedestrian re-identification method based on virtual samples according to claim 1, wherein:
in step s3, two attributes of a color of an upper body clothes and the color of an lower body clothes are selected as basic attributes of sampling to carry out an attribute distribution statistics of the dataset.

7. The pedestrian re-identification method based on virtual samples according to claim 1, wherein:
in step s4, an identification verification process includes: using the trained model to match retrieved pictures in a gallery that are judged to be pictures of the same identity, and outputting corresponding picture indexes in order according to a possibility, and comparing them with real labels.

* * * * *